US012761888B2

(12) United States Patent
Kolesov et al.

(10) Patent No.: US 12,761,888 B2
(45) Date of Patent: Oct. 13, 2026

(54) SYSTEMS AND METHODS FOR FRONTEND WEB APPLICATION CREATION FOR A CLOUD COMPUTING PLATFORM

(71) Applicant: CloudBlue LLC, Irvine, CA (US)

(72) Inventors: Anatolii Kolesov, Moscow (RU); Dmitry Nozdrin, Moscow (RU); Viacheslav Dubinskii, Barcelona (ES); Maxim Bazarov, Moscow (RU)

(73) Assignee: CloudBlue LLC, Irvine, CA (US)

( * ) Notice: Subject to any disclaimer, the term of this patent is extended or adjusted under 35 U.S.C. 154(b) by 228 days.

(21) Appl. No.: 18/089,082

(22) Filed: Dec. 27, 2022

(65) Prior Publication Data

US 2023/0385027 A1 Nov. 30, 2023

Related U.S. Application Data

(63) Continuation-in-part of application No. 17/824,563, filed on May 25, 2022, now Pat. No. 12,461,727.

(51) Int. Cl.

*G06F 8/60* (2018.01)
*G06F 8/30* (2018.01)
*G06F 8/73* (2018.01)

(52) U.S. Cl.

CPC .................. *G06F 8/60* (2013.01); *G06F 8/30* (2013.01); *G06F 8/73* (2013.01)

(58) Field of Classification Search

CPC .... G06F 8/00–38; G06F 8/60–66; G06F 8/76; G06F 8/73

See application file for complete search history.

(56) References Cited

U.S. PATENT DOCUMENTS

| | | | |
|---|---|---|---|
| 6,044,218 | A | 3/2000 | Faustini |
| 6,195,696 | B1 | 2/2001 | Baber |

(Continued)

FOREIGN PATENT DOCUMENTS

| | | | |
|---|---|---|---|
| JP | 7011737 | B2 | 1/2022 |
| WO | 2022095410 | A1 | 5/2022 |

OTHER PUBLICATIONS

Vachhar, V., "Structuring Your StoryBook", StoryBook [online], Feb. 2022 [retrieved Oct. 16, 2024], Retrieved from Internet: <URL: https://storybook.js.org/blog/structuring-your-storybook/>, whole document.*

(Continued)

*Primary Examiner* — Todd Aguilera
(74) *Attorney, Agent, or Firm* — Ice Miller LLP

(57) ABSTRACT

Systems and methods for creating and integrating a frontend microservice application into a host platform. The systems and methods can include communicating, to a UX development platform, a requirements package corresponding to a microservice frontend application; generating, by the UX development platform, a mockup package based on the requirements package; communicating the mockup package to a microservice frontend development platform, to a microservice frontend application; generating, by the microservice application development platform, a microservice frontend application package based on the mockup package; and integrating the microservice frontend application package, wherein a vendor application is integrated utilization the microservice frontend application based on the requirements package.

20 Claims, 7 Drawing Sheets

(56) References Cited

U.S. PATENT DOCUMENTS

| | | | |
|---|---|---|---|
| 6,208,345 B1 | 3/2001 | Sheard et al. | |
| 7,451,403 B1 * | 11/2008 | Srinivasan | G06F 8/10 715/765 |
| 9,455,876 B1 * | 9/2016 | Grebenschikov | H04L 41/20 |
| 9,715,439 B1 | 7/2017 | Fewtrell | |
| 10,237,370 B2 | 3/2019 | Braudes | |
| 10,452,372 B2 * | 10/2019 | Lundberg | G06F 8/70 |
| 10,552,852 B1 | 2/2020 | Shirley et al. | |
| 10,749,856 B2 | 8/2020 | Kostyukov | |
| 10,942,719 B2 | 3/2021 | Dubinskii | |
| 11,256,484 B2 * | 2/2022 | Nikumb | G06F 8/38 |
| 11,397,569 B2 * | 7/2022 | Vihar | G06F 8/38 |
| 2007/0061724 A1 | 3/2007 | Slothouber | |
| 2007/0168658 A1 | 7/2007 | Yamauchi | |
| 2007/0168958 A1 | 7/2007 | Huang et al. | |
| 2010/0070886 A1 | 3/2010 | Poulsen | |
| 2012/0198029 A1 | 8/2012 | Madanes | |
| 2017/0094024 A1 | 3/2017 | Braudes | |
| 2017/0249448 A1 | 8/2017 | Beckman et al. | |
| 2017/0329588 A1 * | 11/2017 | Lundberg | G06F 9/44521 |
| 2018/0089132 A1 | 3/2018 | Atta et al. | |
| 2018/0113680 A1 | 4/2018 | Browning | |
| 2018/0167378 A1 | 6/2018 | Kostyukov | |
| 2018/0203674 A1 | 7/2018 | Dayanandan | |
| 2019/0004779 A1 | 1/2019 | Schmidt | |
| 2019/0132410 A1 | 5/2019 | Kuzkin et al. | |
| 2019/0235993 A1 | 8/2019 | Modeel | |
| 2019/0354354 A1 | 11/2019 | Dubinskii | |
| 2020/0327008 A1 | 10/2020 | Singh et al. | |
| 2021/0342147 A1 | 11/2021 | Singh | |
| 2021/0397418 A1 * | 12/2021 | Nikumb | G06F 40/295 |
| 2022/0070279 A1 | 3/2022 | Pang et al. | |
| 2022/0131852 A1 | 4/2022 | Sharma et al. | |
| 2022/0197620 A1 * | 6/2022 | Vihar | G06F 8/65 |
| 2022/0357977 A1 | 11/2022 | Kalou | |
| 2023/0385027 A1 | 11/2023 | Kolesov | |
| 2023/0385038 A1 | 11/2023 | Kolesov et al. | |

OTHER PUBLICATIONS

International Search Report & Written Opinion issued in PCT/US2023/086086, dated Apr. 12, 2024, 7 pgs.

International Search Report and Written Opinion, dated Oct. 11, 2023, issued in PCT/US2023/067451, 7 pgs.

International Search Report and Written Opinion issued in PCT/US2024/018206, dated May 9, 2024, 7 pgs.

International Preliminary Report on Patentability for International Application No. PCT/US2023/067451, dated Dec. 5, 2024, 6 Pages.

International Preliminary Report on Patentability for International Application No. PCT/US2023/086086, dated Jul. 10, 2025, 06 Pages.

International Preliminary Report on Patentability for International Application No. PCT/US2024/018206, dated Sep. 11, 2025, 11 Pages.

Office Action for Canadian Patent Application No. 3257266, mailed Mar. 17, 2026, 4 pages.

* cited by examiner

SYSTEMS AND METHODS FOR FRONTEND WEB APPLICATION CREATION FOR A CLOUD COMPUTING PLATFORM

CROSS REFERENCE TO RELATED APPLICATION

The present application is a continuation in part (CIP) of U.S. patent application Ser. No. 17/824,563, filed May 25, 2022, entitled SYSTEMS AND METHODS FOR INDEPENDENT APPLICATION DESIGN AND DEPLOYMENT TO PLATFORM HOST, the disclosure of which is hereby incorporated by reference herein.

TECHNICAL FIELD

This invention relates to a method and a standard for application packaging and integration, and, more particularly, to application resource integration and deployment into a cloud.

BACKGROUND

Computer systems present some challenges with regard to developing and installing updates and patches to hosted web applications. Software as Service (Saas) web applications are integrated into systems by a vendor using special delivery and installation packages. However, if the vendor needs to integrate/deploy his application into a cloud, he will have to repeat all integration operations for each host or hosting platform several times. The hosts and the hosting platforms have applications that control the host or the hosting platforms. These applications make it very difficult and expensive to integrate external (third party) applications or web services.

Currently, integration of applications into hosts and hosting platforms is implemented by a controller. In case of a cloud system. A cloud (or cloud server) is a software-hardware combination of a host provider, which provides for functionality of external applications in its client's accounts.

In the field of cloud computing platforms, there exists an inefficiency of creation and deployment of client applications in conjunction with platform form operations. For example, cloud computing platforms may encounter problems related to effective application development and/or host deployment. Software as Service (SaaS) web applications are generally developed in a rigid association with a platform host. All processes relating to new applications in development are rigidly tied to platform host stacks deployment. Such method brought inconveniences and time losses in common with background related to necessity to resolve problems with applications on a core level.

The main disadvantage of conventional technologies is that, during a new application creation and deployment, a platform host is required to communicate packages having indefinite testing environment inside a package during application development. Moreover, the conventional technologies require excess deployment time, and a continuous internet connection is required during application creation. Accordingly, there is a need in the art for an efficient and inexpensive method for integration of the application itself, application updates and patches into a cloud platform host.

BRIEF SUMMARY OF THE INVENTION

Embodiments described herein provide for frontend microservice development. Specifically, embodiments disclose systems and methods for creating and integrating a frontend microservice application into a host platform. The systems and methods can include communicating, to a UX development platform, a requirements package corresponding to a microservice frontend application; generating, by the UX development platform, a mockup package based on the requirements package; communicating the mockup package to a microservice frontend development platform, to a microservice frontend application; generating, by the microservice application development platform, a microservice frontend application package based on the mockup package; and integrating the microservice frontend application package, wherein a vendor application is integrated utilization the microservice frontend application based on the requirements package.

Conventionally, a frontend developer may encounter several challenges developing separated from the whole platform microservice to be used in a platform host as a part of multi microservice environment. Developing microservice via platform host raises supplementary development costs including deployment and sandbox adjustment (i.e., to the stack and platform host). Even minor changes to microservice code can necessitate deployment of all code to a stack again, resulting in transport loss. Frontend developers are usually provided with requirements for UI (User Interface) elements (buttons, fonts, colors, and others) and implementing each time from the scratch. The developer has to take into account many aspects in addition to writing the core of the business task itself of: how the microservice should appear with respect to the application itself, and how the microservice may appear and function in the common interface (platform host) and compliance with a single experience.

In some embodiments, FMD methods and systems can include a local microservices development mode that functions independently from a platform host, as described in detail in U.S. patent application Ser. No. 17/824,563, which is incorporated by reference in its entirety herein. In some embodiments, FMD methods and systems can additionally include processes for mockup and tokenization, i.e., tokens maintained in a unified library of widgets, for example, supported independent from a specific application and available to a frontend developer. In some embodiments, FMD methods and systems can further include interaction of microservice with the external world. For example, FMD methods and systems can enable communication between the frontend microservice in development with other microservices, the host itself, the Representational State Transfer (REST) request system, unit testing, application debugging, simulation of communication before host deploys, etc.

In some embodiments, FMD methods and systems can also include the use of specific cloud framework(s) as part giving everything needed to frontend developer and getting back the result as application, integrated part of the process. The framework preliminary separates new microservice (web application) to specific program layers. According to embodiments described here, task resolution is achieved effectively by good organization of communication among different parts of "blocks" involved into web application creation process overall. Thus, faster application readiness, improved testing and debugging, and reduced costs of application development can be obtained.

Such approach allows to decrease the time of frontend developer spent to a new microservice, allows him to be lower skilled. FMD systems and methods require a developer only to combine software layers, do debugging process and further deploy to a stack and a platform host a workable microservice. Specific REST-Store vertical details provide effective frontend-backend connection of the microservice developed described below allowing developer use one and the same code for such modes as local development (with emulated data transport level), unit testing and in production (runtime).

According to embodiments of the present invention, Systems and Methods for Frontend Microservice Development (FMD) are provided to improve application development process. The FMD solution effectively addresses the above-mentioned technical problems, providing an independent application creation process and efficient application deployment to a platform host minimizing downtime, on a platform host core level.

FMD systems and methods are provided for creating, sharing, and integrating a vendor application. Systems and methods for application development and deployment can include communicating, by a host platform, a framework package corresponding to an application framework, wherein the framework package comprises a software abstraction for providing generic functionality in developing a vendor application, receiving, by the host platform, an application package corresponding to a vendor application, wherein the application package comprises a plurality of metadata files, control method descriptions, and content files, and integrating the application package to generate an integration of the vendor application based on the application framework.

According to some embodiments, FMD systems and methods differ from previous prior art technologies in that the rigid connection application-host is broken at the time of application development. The host "adopts" already workable application that is easily deployed there. Even constant internet connection when application developing is not required for such scenario. Conventional systems and methods can require several hours merely to begin a process of developing new application, due to host operations. According to exemplary embodiments, a platform host is separated from application development process which brought many efforts. A new application can be created and tested before host deployment to enable production of reliable applications when deployed. Moreover, the necessity of fixing faults due to a host core level is omitted during application development, resolving an additional problem in conventional technologies. FMD systems and methods enable efficient application creation with respect to speed, reliability, resource savings.

BRIEF DESCRIPTION OF THE DRAWINGS/FIGURES

DETAILED DESCRIPTION OF THE INVENTION

Figure 1:
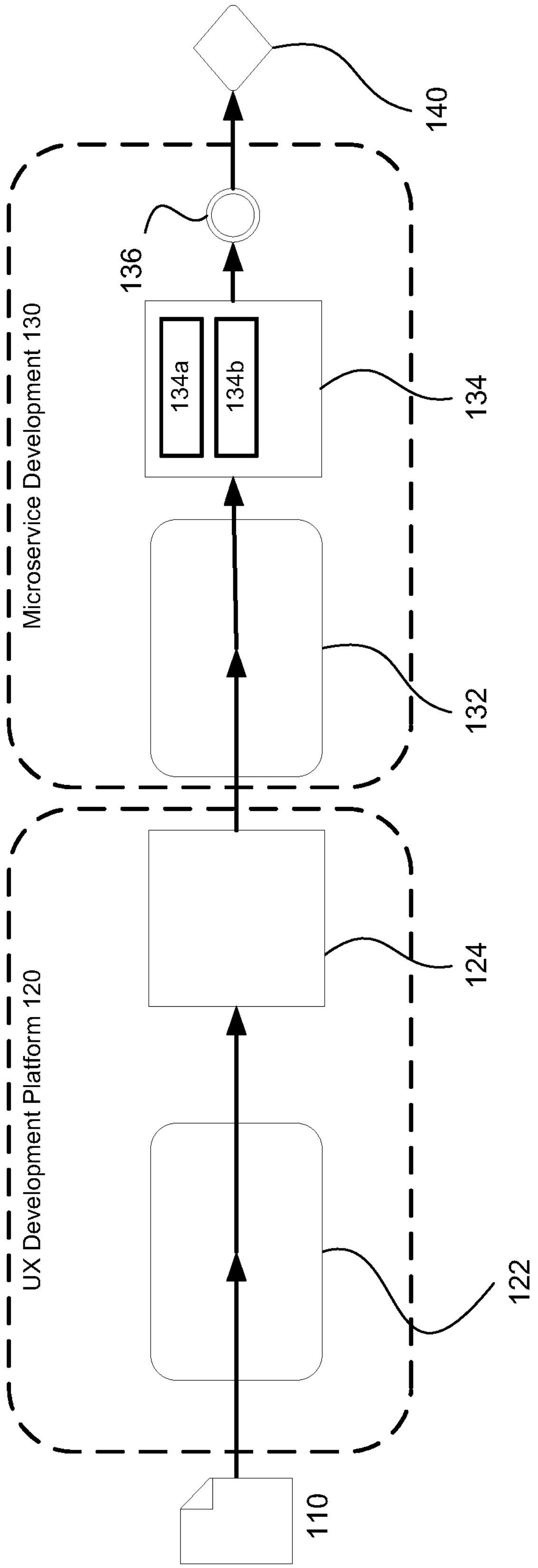
FIG. 1 depicts an example operating environment of a system for frontend microservice development (FMD), according to some embodiments.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Microservice Creation

Embodiments described herein are directed to FMD methods and systems that can include a local microservices development mode that functions independently from a platform host, as described in detail in U.S. patent application Ser. No. 17/824,563, which is incorporated by reference in its entirety herein. In some embodiments, FMD methods and systems can additionally include processes for mockup and tokenization, i.e., tokens maintained in a unified library of widgets, for example, supported independent from a specific application and available to a frontend developer. In some embodiments, FMD methods and systems can further include interaction of microservice with the external world. For example, FMD methods and systems can enable communication between the frontend microservice in development with other microservices, the host itself, the Representational State Transfer (REST) request system, unit testing, application debugging, simulation of communication before host deploys, etc.

Frontend Microservice Development (FMD) systems and methods are provided to address the above-mentioned technical problems. FMD systems and methods provide a specific layer for a vendor microservice application frontend that provides all resources needed to a frontend developer to return an application as an integrated part of the process. The FMD facilitates task resolution effectively organizing and enabling communication between different components of web application creation process blocks. The FMD systems and methods enable timely application readiness, and improvements in testing and debugging. Thus, better operability of end user applications is achieved with reduced costs of application development. The frontend developer is enabled to specifically combine software layers and perform debugging process, deployment while minimizing time and effort spent developing a new microservice. FMD systems and methods include specific REST-Store vertical details to provide a more effective frontend-backend connection of the microservice, allowing the developer to use a single compilation of code for such modes as local development (with emulated data transport level), unit testing and runtime (i.e., production).

FIG. 1 illustrates an FMD system, according to some embodiments. As shown in FIG. 1, FMD systems 100 provides an ecosystem for several projects that can be separated based on, for example, functionality, responsibility and teams. FMD system 100 comprises microservices requirements package 110, UX development platform 120, microservice platform 130, and implementation (to end user) by platform host 140.

As shown in FIG. 1, a UX development platform 120 can receive application microservice requirements 110 corresponding to a microservice application, such as a new application. UX system 100 can transmit the requirements to a UX development team 122. UX development platform enables UX development team 122 to generate one or more mockup(s) 124 associated with application microservice requirements 110. This is a distinct approach from conventional methodologies for post-generation of mockup. According to embodiments, separate style sheet language (e.g., Cascading Style Sheets, or CSS) variables can be implemented initially in mockups, and physically imported into the UI Kit and into the microservice applications. According to embodiments, separate SASS CSS (SCSS) variables can be implemented and imported. Accordingly, such embodiments enable parity between the resulting layout and the mockups.

Figure 4:
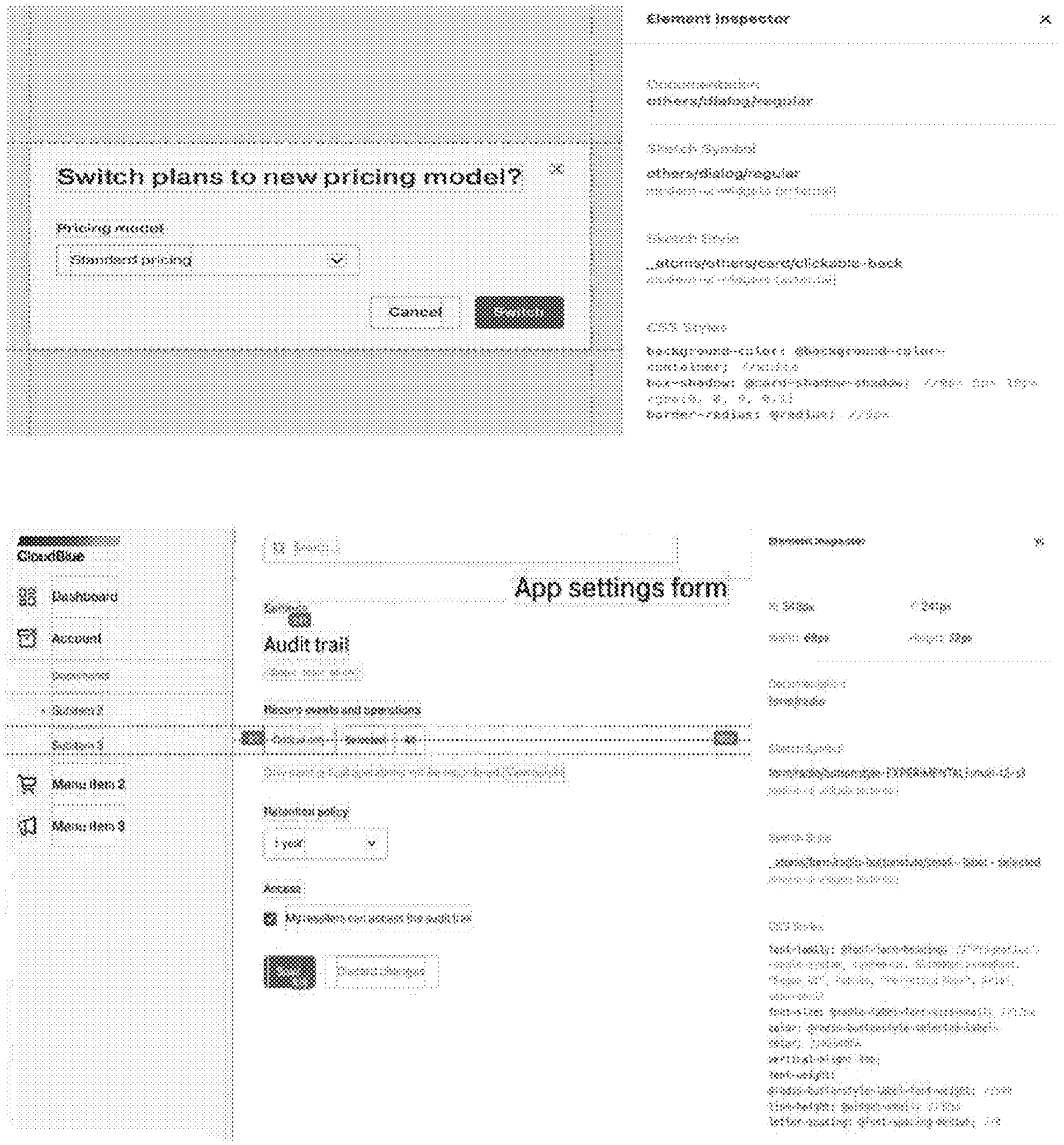
FIG. 4 depicts mockup and tokenization in an FMD, according to some embodiments.

UX development platform 120 enables creation of a set of design tokens, i.e., variables-constants for specific components and cases of their use. Operation 310 includes the creation of variables-constants that can be already used in handoff (visual look and feel documentation) gallery of reference components. See, for example FIG. 4, which illustrates an exemplary mockup including design tokens. The mockup is configured to be developed as an application, page by page. The UX development platform 120 enables the developer to easily and intuitively create, view and modify variables-constants, which can be based on the handoff gallery of reference components. According to embodiments, FMD system 100 facilitates customization and skinization, where skinization refers to a process of applying one or more specific set(s) of user experience (UX) for each consumer. For example, skinization can involve the application of specific tokens, colors, icons, etc.

FMD system 100 enables one or more mockup(s) 124 to be transmitted to and/or retrieved by a microservice platform 130. Microservice development platform 130 enables one or more developer(s) 132 to generate microservice frontend application 134 associated with application microservice requirements 110, utilizing mockup(s) 124. Microservice development platform 130 performs page-by-page microservice design development. Microservice development platform 130 includes testing module 136 that further enables developer(s) 132 to conduct unit testing, end-to-end (e2e) testing, etc. and debug microservice frontend application 134.

As depicted, microservice frontend application creation at development platform 130 is separated from the platform host 140 itself. According to the exemplary embodiment, one or more frameworks associate an application of development platform 110 to a (production) application of platform host (130). That is, the framework(s) mutually connect the respective applications. The framework(s) comprise fundamental templates needed for application and testing at development platform 110. The framework(s) also comprise necessary specific means to integrate and deploy an application at a platform host (hosting cloud) 130.

In an exemplary embodiment, microservice development platform 130 enables generation microservice frontend application 134 based on application code **134*a* and framework 134*b*. Application code 134*a* can include developer-written code. Framework 134*b* (e.g, VUE) can provide a software abstraction for providing generic functionality, that can be selectively adapted and implemented by application code 134*a*, thus providing application-specific software, such as for building user interfaces. Framework 134*b*** can provide this abstraction built on top of standard programming languages (e.g., HTML, CSS, JavaScript, etc.), providing a declarative and component-based programming model permitting efficient development of application-specific software, such as a user interface, whether simple or complex.

When FMD 100 is configured to deploy application 134, development platform 110 can generate an application bundle that implements application 134 and framework 104 as a stand-alone, all in one container. According to the exemplary embodiment, developer 132 (e.g., a cloud application vendor or the like) can bundle application code **134*a* and framework 134*b* according to the APS. The format of the bundle depends on the receiver, such as platform host 130**. If the receiver is a standard WINDOWS desktop, then the software can be packaged using standard installers, and the file has a *.exe or *.msi extension. The installer includes unpacking rules, that includes a user dialog, writing into the registry, checking for updates, and so on. In the case of APS, the bundle can have a app.zip extension, and includes metadata, scripts and software code itself.

Exemplary development application 102 is transferred via an application bundle to platform host 140. microservice frontend application 134 is generated inside the platform host 140 based on frontend applications **134*a* and framework 134*b*. Platform host 140 can include a controller, i.e., an application packaging controller, having a runtime module configured to distribute microservice frontend applications 134 to one or more end user(s). The APS is a specification defining a life cycle of microservice frontend application 134 in a cloud. The application's life cycle includes packaging, delivering to the cloud, integrating (and unpacking/deploying) into the cloud, distributing to clients, licensing, functionality, updates and deletion. The APS can include an Application Programming Interface (API) for accessing the APS functions from a program code or by http/https requests. The APS provides for efficient integration of SaaS web applications, such as microservice frontend application 134, into the cloud. According to the exemplary embodiment, in order for an application to function according to the APS, an APS module 138 (i.e., a controller) is integrated into a software hosting platform of a hosting cloud (platform host 140). APS module 138 functions as a connector for controlling microservice frontend application (s) 134**.

Mockup Generation

Figure 2:
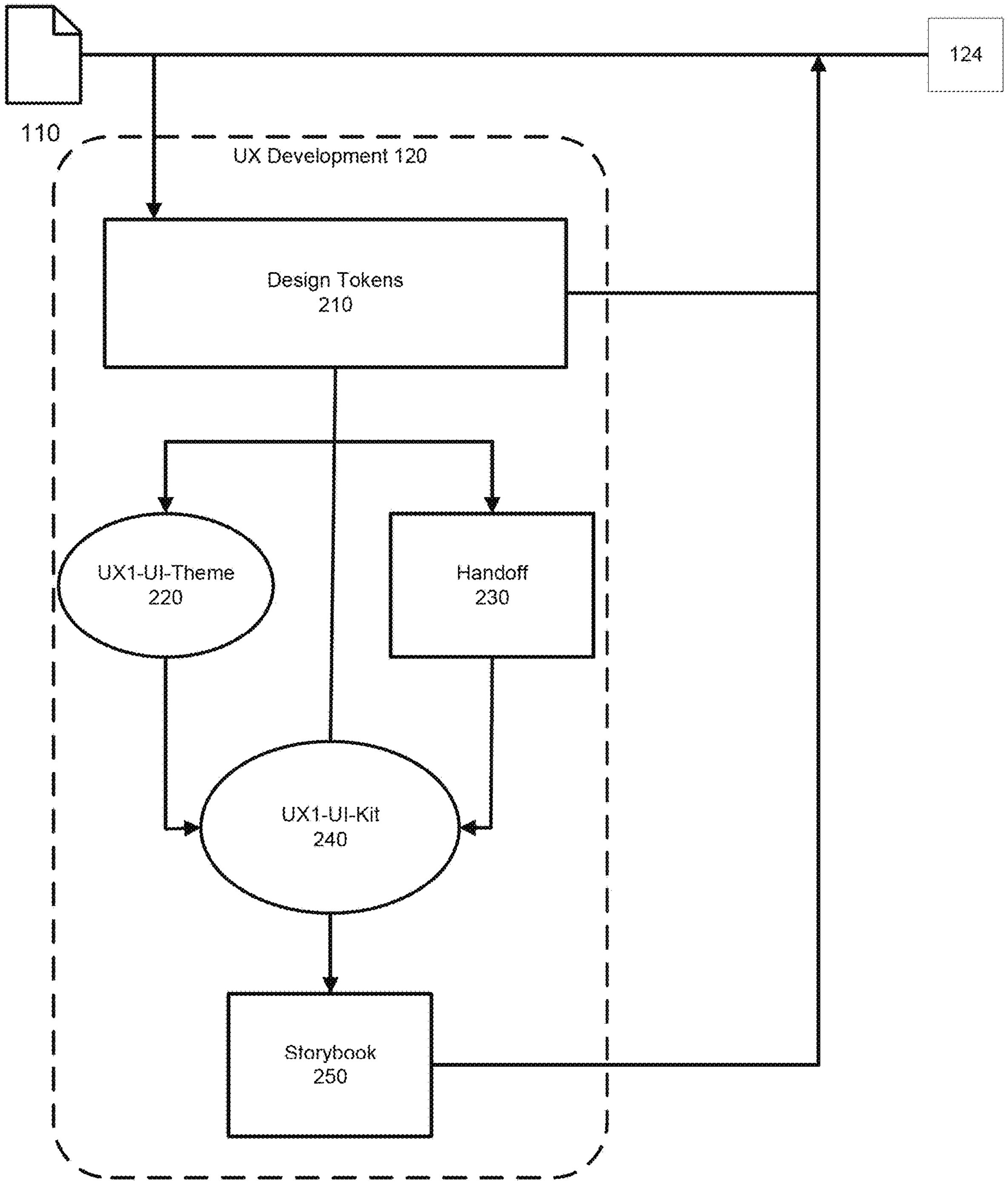
FIG. 2 depicts an FMD system, according to some embodiments.

FIG. 2 illustrates UX development platform 120 of FMD system 100, according to some embodiments. As shown in FIG. 2, FMD systems 100 provides an ecosystem for several projects that can be separated based on, for example, functionality, responsibility and teams. FMD system 100 comprises microservices requirements package 110, UX development platform 120, microservice platform 130, and implementation (to end user) 140.

As shown in FIG. 2, a UX development platform 120 can receive application microservice requirements 110 corresponding to a microservice application, such as a new application. UX development platform enables implementation of one or more design token(s) 210 based on microservice requirements 110. Tokenization refers to variables-constants for components and cases (conditions). Token design sets are created, interconnected with design components, which can then be used for other projects, and which can be redone based on changes in the project.

UX development platform 120 includes a handoff 230 document, which can include a gallery of reference components. UX development platform 120 can enable a handoff mode on mockups to facilitate sharing detailed information about design tokens used in mockups. Handoff 230 can include each detail and digital asset required for the development team to bring a microservice frontend design to life.

UX development platform 120 enables one or more Development UX-UI-Theme(s) 220 to be utilized with handoff 230 in the implementation of one or more Development UX-UI-Theme-Kit 240 based on microservice requirements 110. SCSS variables can be physically imported into UI-Theme-Kit 240 to minimize inconsistencies in the mockup(s), address designs issues and permit customization and skinization.

UX development platform enables implementation of one or more design Storybook(s) 250. Storybook(s) 250 enable UX developers to develop components, permits documenting components for reuse, visually tests such components, and capture their states to spot inconsistencies. In addition, FMD system 100 enables publishing Storybook(s) 250 by UX development platform 120 as one or more mockup(s) 124 published to be implemented by microservice development platform 140.

Figure 3:
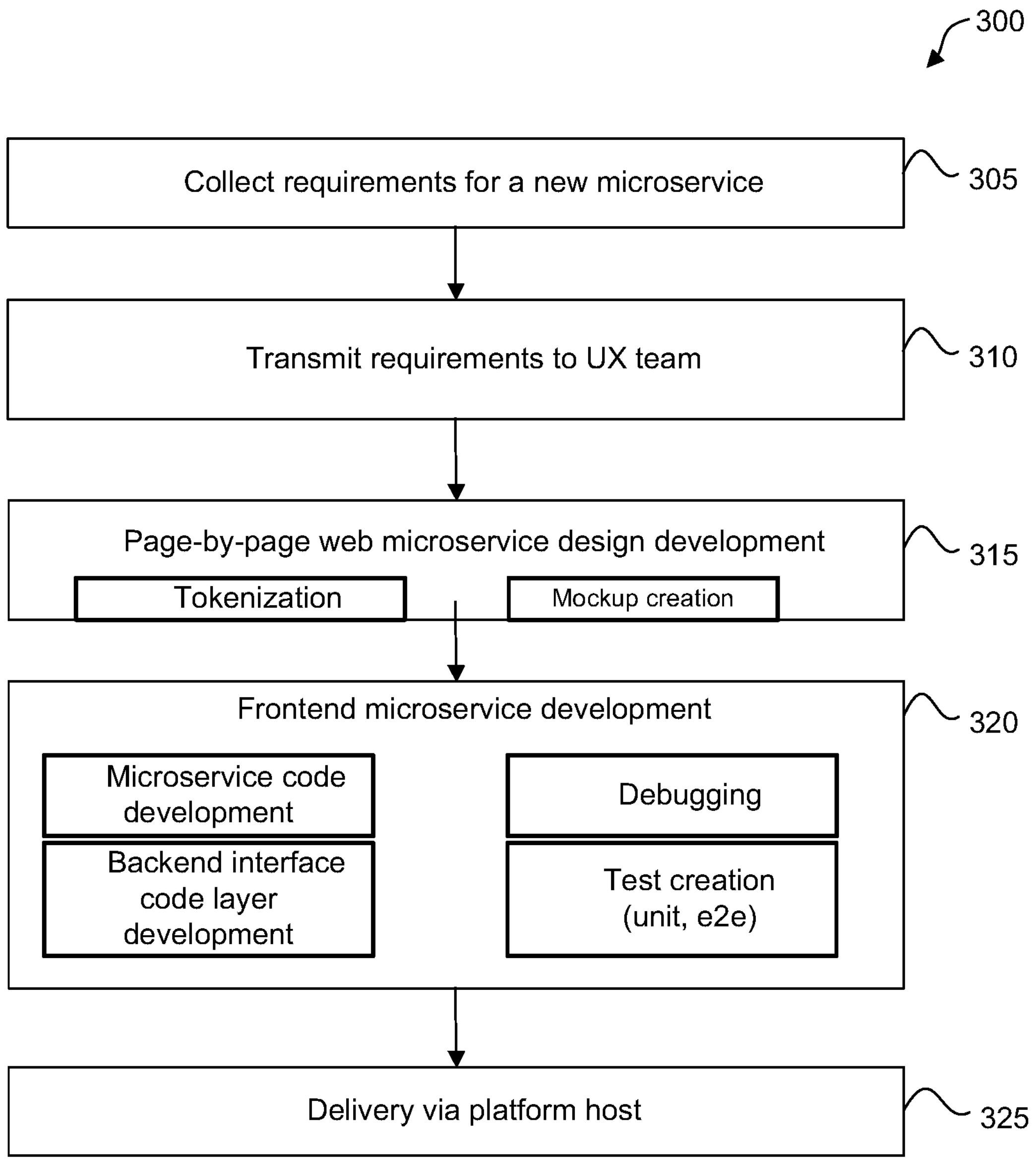
FIG. 3 depicts a methodology for development and delivery of a microservice frontend in an FMD system, according to some embodiments.

FIG. 3 illustrates FMD methodology 300 to develop and integrate a new frontend microservice to be integrated at runtime. Utilizing a framework that comprise means for frontend development, new applications can be created and deployed in a cloud computing environment. According to embodiments, FMD method 300 enable old and new applications to work in parallel concurrently.

As shown in FIG. 3, at operation 305, a frontend development computer 130 can receive application microservice requirements corresponding to a microservice application, such as a new application. At operation 310, FMD system 100 can transmit the requirements to a UX development team.

At operation 315, page-by-page microservice design development is performed. Operation 315 can include generation of mockups associated with the microservice design. This is a distinct approach from conventional methodologies for post-generation of mockup. According to embodiments, separate SCSS variables can be implemented initially in mockups, and physically imported into the UI Kit and into the microservice applications. Accordingly, such embodiments enable parity between the resulting layout and the mockups. Additionally, operation 315 can permit designers themselves to address design issues. The embodiments provide another advantage in facilitating customization and skinization, where skinization refers to a process of applying specific set of user experience (UX) rules specific for each consumer. For example, skinization can involve the application of specific tokens, colors, icons, etc.

Operation 315 includes one or more processes for creation of a set of design tokens, i.e., variables-constants for specific components and cases of their use. Operation 310 includes the creation of variables-constants that can be already used in handoff (visual look and feel documentation) gallery of reference components. See, for example FIG. 4, which illustrates an exemplary mockup including design tokens.

Operation 315 can include the integration of design tokens into the theme project, to UI elements override, and to Framework UI project KIT. Tokens can be used inside the main project (Framework) and also in UI KIT project as a part of Framework project, and in final microservices. Tokenization methods are used such that token design sets are created and interconnected with design components, which can then be used for other projects and reconfigured based on changes in the project. A token defines one or more sets of variables-constants. For example, as shown in (see below images) a token defines one or more sets of variables-constants for components and cases (conditions) where they are used.

When one or more tokens are changed, they are transmitted to web applications and change the presentation without the need for developers to work. The use of a tokenization sub-process allow these changes to be implemented without hardcoding widget styles (colors, font sizes, margins, etc.) by designers and developers. In addition, one or more tokens can be provided with one or more a default value(s) to allow microservice applications to execute locally during development.

In some embodiments, each design token can be provided in a single file that includes all such design tokens. Any token update can include execution of the following sub-processes: (1) automatically updating a designer widget library; (2) automatically updating a developer theme package; and (3) updating a product with new styles in accordance with the design token(s).

Each mockup can be implemented in a "handoff" mode by developer(s). In Handoff mode, information can be communicated about design tokens used in mockups. Design tokens can be integrated further to a theme project, to UI elements override, and to Framework UI project KIT. Tokens are used inside the main project (Framework) and also in UI KIT project as a part of Framework project, and in final microservices.

At operation 320, Frontend microservice development is performed. Operation 320 can include one or more sub-processes for generation of microservice. Operation 320 can include one or more sub-processes for page-by-page development of the microservice, involving the development of software code for the microservice. Page-by-page microservice development can be configured to commence after mockups for each web screen views are created. Each page is developed based on an associated mockup. A mockup can define common positioning of elements-components and components themselves. According to this methodology, the developer only needs to perform steps to compose page of blocks-components, adjust each component according to requirements and integrate required specific parameters. Each component already has functionality and representation (handoff, storybook) and supplementary development is unnecessary. Operation 320 can also include one or more sub-processes for development of a code layer for communicating with the backend. In addition, Operation 320 can include one or more sub-processes for debugging and testing (i.e., creating unit tests, end-to-end tests, etc.).

At operation 325, Frontend microservice delivery is performed. Operation 325 can include integration and frontend microservice delivery to an end user, as described below.

Integration

Figure 5:
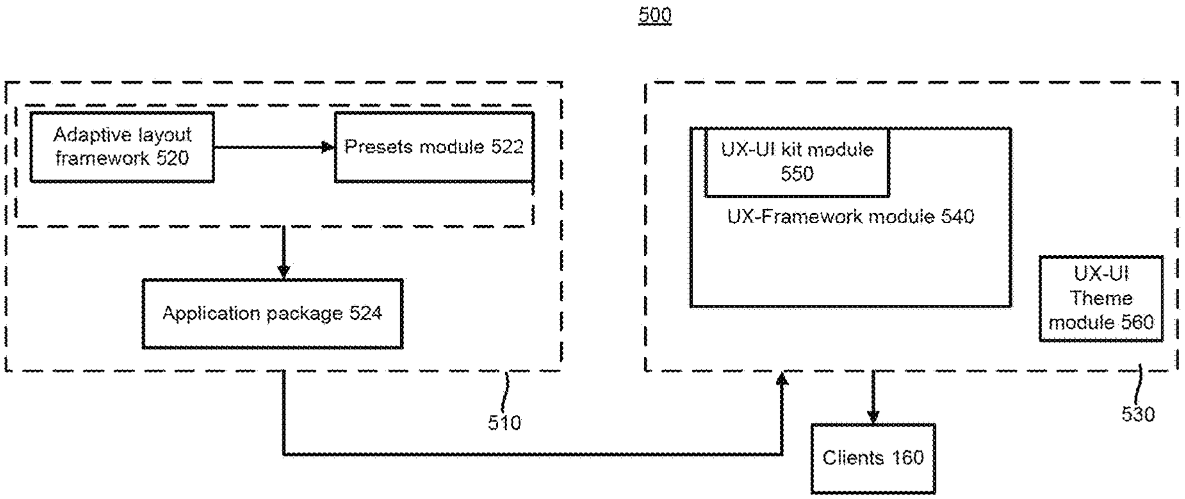
FIG. 5 depicts an FMD system, according to some embodiments.

FIG. 5 illustrates communication of the application with the platform host. As shown in FIG. 5, system 500 comprises local development application 510 and platform host 530. Local development application 510 comprises adaptive layout framework 520 (skeleton) and presets module 522, which can include fast development system presets. A preset can include, for example, one or more plugins, with some optional configuration. For example, a preset can contain plugins/options bundled together with other configuration options so that selecting a preset would mean selecting all those options.

For example, a default preset can include plugins (e.g., Babel, Typescript, Vuex, ESLint, Unit-Jest, etc.) as options/features. If a developer selects the default preset, local development application 510 can be created and install utility modules during project creation. Additionally or alternatively, a developer can also manually select desired options and plugins. A preset enables faster project creation. Presets module 522 operates in communication with adaptive layout framework 520 (skeleton).

As described above, the environment is prepared with the framework as a supplementary layer. The framework comprises everything required for a new application in isolation from the production stack, which can also be used for testing. As described in more detail below, an application can be compiled to a bundle file to be dynamically communicated to a platform host, enabling communication and implementation to a platform host to be optimized. The bundle file can be prepared as a set of asynchronous web components which can be communicated part-by-part upon opening a new page-representation of the application.

According to some embodiments, platform host 530 can comprise a user experience (UX) framework module 540, UX-user interface (UX-UI) kit module 550, and UX-UI theme module 560. UX framework module 540 comprises runtime components for operating in runtime, for local development and for testing. For example, platform host 530 can be an embodiment of platform host 130. In some embodiments, platform host 530 can include UX-UI kit module 550 that comprises means for creating ready form via mockups using a set of components (UI blocks), as a private part integrated into UX framework module 540. UX-UI theme module 560 provides a repository that comprises design tokens, global styles and override styles, i.e., elements representing design decisions and values.

Unlike conventional deployment processes, a hot module replacement (HMR) process can be performed to permit development of application 510 utilizing an environment of framework (e.g., corresponding to UX framework 540). Therefore, a developer can assess changes in application 510 without causing the application to be deployed at platform host 530.

Platform host 530 may receive a first indicator from IADD system 500. According to some embodiments, platform host 530 can be triggered, for example, in response to a prompt by IADD system 500, a request from a local development platform, a scheduled event, or the like, to request a status of local development application 510.

In response to receiving the first indicator, platform host 510 perform an operation of receiving development application 510. In some embodiments, platform host can request that development application 510 be transmitted and await the transmission. In some embodiments, the transmission is performed asynchronously.

After receiving a transmission that includes development application 510, platform host 530 can then perform processes to integrate the application. In some embodiments, platform host 530 continues a runtime of a current version of the application, which can be an APS runtime, and integrates the application minimizing downtime. For example, in some embodiments, platform host 530 can synchronously apply web components to integrate the application. In some embodiments, platform host 530 can provide a supplementary layer (e.g., framework 540) to a development platform. Framework 540 can include fundamental abstractions of an operating environment, to enable the development platform to be configured as required for development of an application in an isolated of stack form. Framework 540 provides foundational support for application architectures used for application development and testing.

A compiled bundle file (e.g., Application Package 524) can be provided to be dynamically downloaded to a platform host. File downloading to a platform host can thereby be optimized. The bundle file can be prepared as one or more asynchronous web component(s) that can be downloaded incrementally when a new page (i.e., route or representation of application) is rendered by an APS adapter.

At the same time, final bundle file comprises no code of primary vendor-libraries. This code is downloaded into a host from framework 540 directly. In this manner, application deployment can be performed minimizing a bundle file size, where the bundle file comprises specific business layer code only. The IADD system and methodology permits organization of web components for optimal platform host deployment. Web components provide a new layer of isolated applications independent of the platform host.

Accordingly, new applications are configured by IADD systems and methods to exist in parallel with old applications, and the applications do not influence each other. That is, new and old applications coexist with optimal platform host load.

Providing supplementary features in a framework (e.g., adaptive layout framework 520) for local application development enables convenient debugging processes that can include the use of specific real-time means, such as utility tools that help a developer in developing applications (for example, VUE DEVTOOLS).

Due to the independent application creation mode, faster application creation can be achieved due to the absence of the need to send code to the stack every time to check it, so that the set business goals are achieved faster, which was not the case before. Such process organization bring convenience into process, time saving. Additional advantages include deployment of more reliable applications and patches. The same environment is prepared by the framework for runtime and for testing and for local development. At the framework level each potential runtime use case is considered, and development is possible by focusing on a specific business layer. In this manner, a smoother transition from an old workflow to a new workflow can be achieved, permitting incremental development to be performed while minimizing unnecessary downtime.

Figure 6:
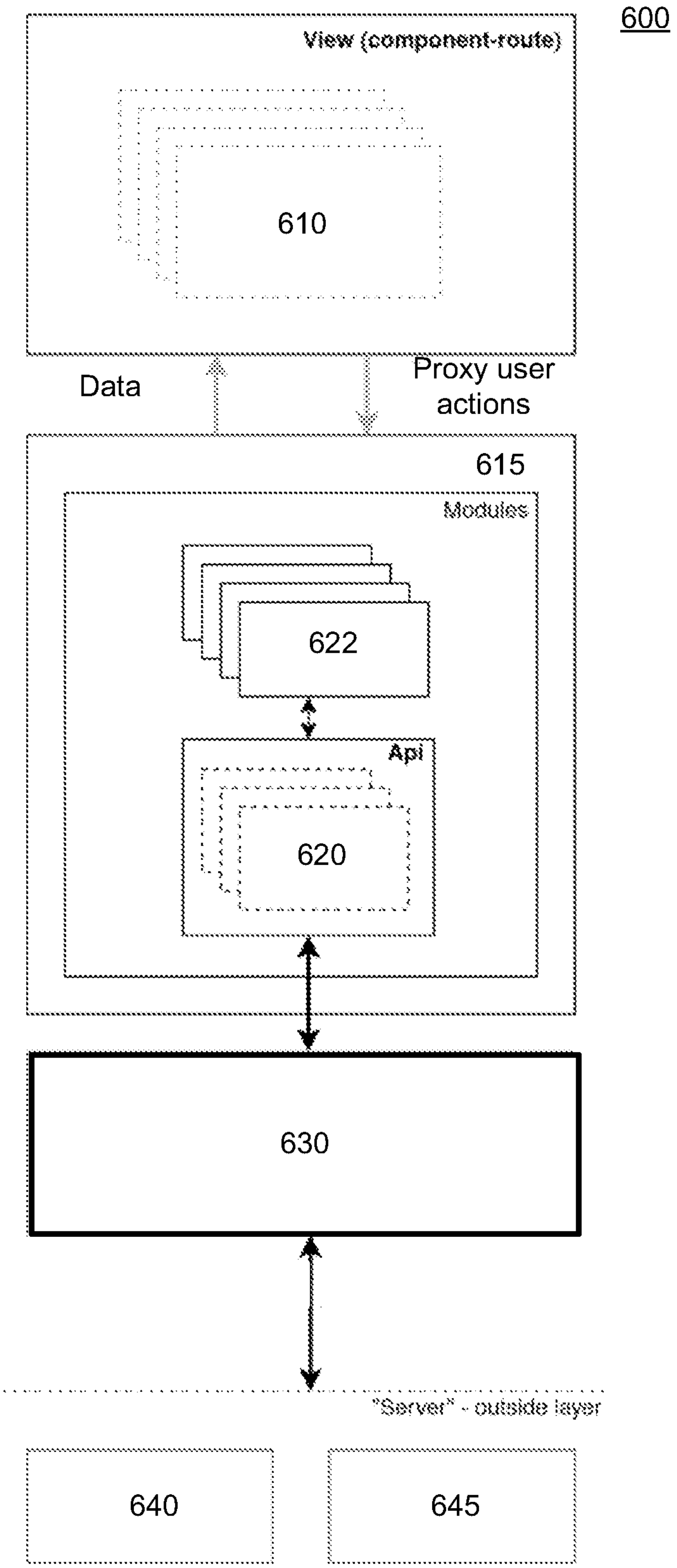
FIG. 6 depicts integration of an application rendered by a platform host in an FMD system, according to some embodiments.

FMD system 400 can include a container as a controller representing the application utilizing a set of web components. As shown in FIG. 6, to render application 610 to a client (e.g., client 160), application 610 represents itself as the set of web components, such as routes 620.

System 600 comprises one or more container(s) that function as controller 615 comprising a component/rout store of application 610. The route store 615 acts as an upper layer of one or more web component(s) configured to organize the flow and operation of other web components, i.e., routes 620. Routes 620 are web components that can be provided having an organization implemented by controller 615. Route array 620 comprises one or more routes, providing a library for page navigation (routes) in applications, e.g. web applications. Each route 620 is another view that the web application 610 can render (e.g., current route 622) or hide as requested, for example, by user navigation. Application 610 can include specific representations having an internal physical structure. Therefore, application 610 itself represents web components, i.e., routes 620, that are configured to control other web components.

Route store 615 is configured to connect, for example via an API, REST-Store layer 630 and function as an upper layer of one or more web component(s) configured to organize the flow and operation of other web components. REST layer 630 can be configured to connect to a microservice backend application 640 and an Application Packaging Standard (APS) bus 645. REST layer 630 can be configured to perform a data request and retrieve data to microservice backend application 640 and Application Packaging Standard (APS) bus 645.

This environment is prepared with a supplementary framework (FW) layer. The FW comprises everything required for a new application in an isolated of stack form. A same, singular FW can be used for the creation of unit tests, additionally.

New application integration can further include creation of a compiled bundle file to be dynamically downloaded to a platform host. File downloading to a platform host is also optimized. Said file is prepared as set of asynchronous web components which can be downloaded part-by-part at time of opening new page-representation of application. At the same time, final bundle file comprises no code of primary vendor-libraries. This code is downloaded into a host from FW directly. In some embodiments, a final bundle file comprises specific business layer code only providing minimal bundle file size. Such process organization provides optimal and effective platform host deployment.

Usage of web components provides new layer of isolated applications from old applications and from platform host. In such a manner new applications do not influence on old applications; they exist in parallel with optimal platform host load. A debugging process can be performed via the use of specific real-time means, such as Vue Devtools. After the microservice frontend is generated, a developer is enabled to obtain a workable draft for future application development, that determines application structure, patterns and principles of development, unit tests with the use of framework. A microservice application can have a rigid structure composed of at least:

- Coverage—code coverage information. Used for sending to SonarQube. Created automatically after building the project;
- Dist—contains all artifacts of application. Created automatically after building the project;
- node_modules—all application dependencies;
- Public—all application static files: i18n, images, etc;
- SRC—application source code. Main working folder;
- Tests—application tests. Second main working folder;
- Supplementary files from root—contains various configuration files for application development components (as example Babel, Jason, Config).

For example, a microservice application in development can specify the following parts:

- System—these project objects should not be changed.
- Semi-systemic—these project objects can be changed the contents of files in add mode, but not change what was originally.
- User—these project objects can be changed at the discretion of the developer. There are only general guidelines that can be followed to ensure consistency across all applications in the platform.

In runtime, a layer can be provided for performing communication with a microservice backend. Specifically, a REST-Store layer can be provided as a software and technology layer of the application that provides interaction with the application backend. REST-Store layer can perform interactions and provide structure of the components itself.

The REST-Store layer can be implemented in different environments. Local development mode uses emulated transport level as for development as for further unit tests (plug). Transport level is a REST (Representational State Transfer) service responsible for execution of REST methods like GET, POST and others. At production (runtime), a physical transport level can be utilized. Therefore, the developer can use the same code for various stages without the necessity of doing it in different modes in different ways. Such vertical provides higher speed and accuracy for frontend-backend connection of the application (microservice) making it in the most effective way.

After that, it describes all the data for the operation of the MOCK system, the ability to fully develop locally without connecting to the network at all (Internet, corporate). This layer simulates connection to the backend allowing local development.

Testing

To ensure the quality of the code, it is necessary to cover it with tests. Tests can be divided into several groups based on subject (i.e., test object, case, etc.):

- testing UI components {a component that performs a UI task—for example, it renders something according to input parameters, and/or does some actions inside and reports it to the outside world and does not have external dependencies according to internal logic.
- testing forms with validation
- store testing: for components, for views
- Testing of components using store: business components, router components. They have two variations:
  - with a mock store at the component level—it is used to test the logic of the component itself in isolation.
  - with a simulation of the entire communication of the component with the backend (integration of the component-store bundle)—used to test both the logic of the component and the logic of the store together with each other.

For mock types use the same mock system as for local development. Also, there is a section for testing at the framework level, which has everything to prepare environments for tests, The environment provides all its features, methods and approaches. In addition, there are helper methods for testing some specific basic components, various utility methods.

Debugging

If necessary, it is possible to debug the application using the dev-tools standard for the view, which greatly facilitates and speeds up this process itself. In runtime (platform host), the dev-tools works in a limited mode, this is due to the architecture of deployment and operation of the finished application in this environment.

For the local development process, a system of prompts has been created for working with the mock system: when accessing the backup for data for which there is no mock yet, no error occurs, but instead a debug message is issued in the console about which rest method and which rest service and with which parameters it was launched, after which you can it is easy to create mock data for a specific rest method and continue development with a full simulation of work in real conditions. Embodiments described herein improve transparency, linearity and clarity of the development process. For each stage, all specific development cases have been worked out.

All this allows the engineer to focus only on creating the business logic of the application core, without distraction to secondary activities in the form of creating components, architectural design of the entire application as a whole and its individual layers, for example, a layer for communicating with the back. All this has already been solved systematically, and all that remains is only to use it. In such a manner of application development, bugs are localized in specific technological layers and there is easy to find them fast and fix according to their nature. Therefore, the process of development goes highly effective.

Figure 7:
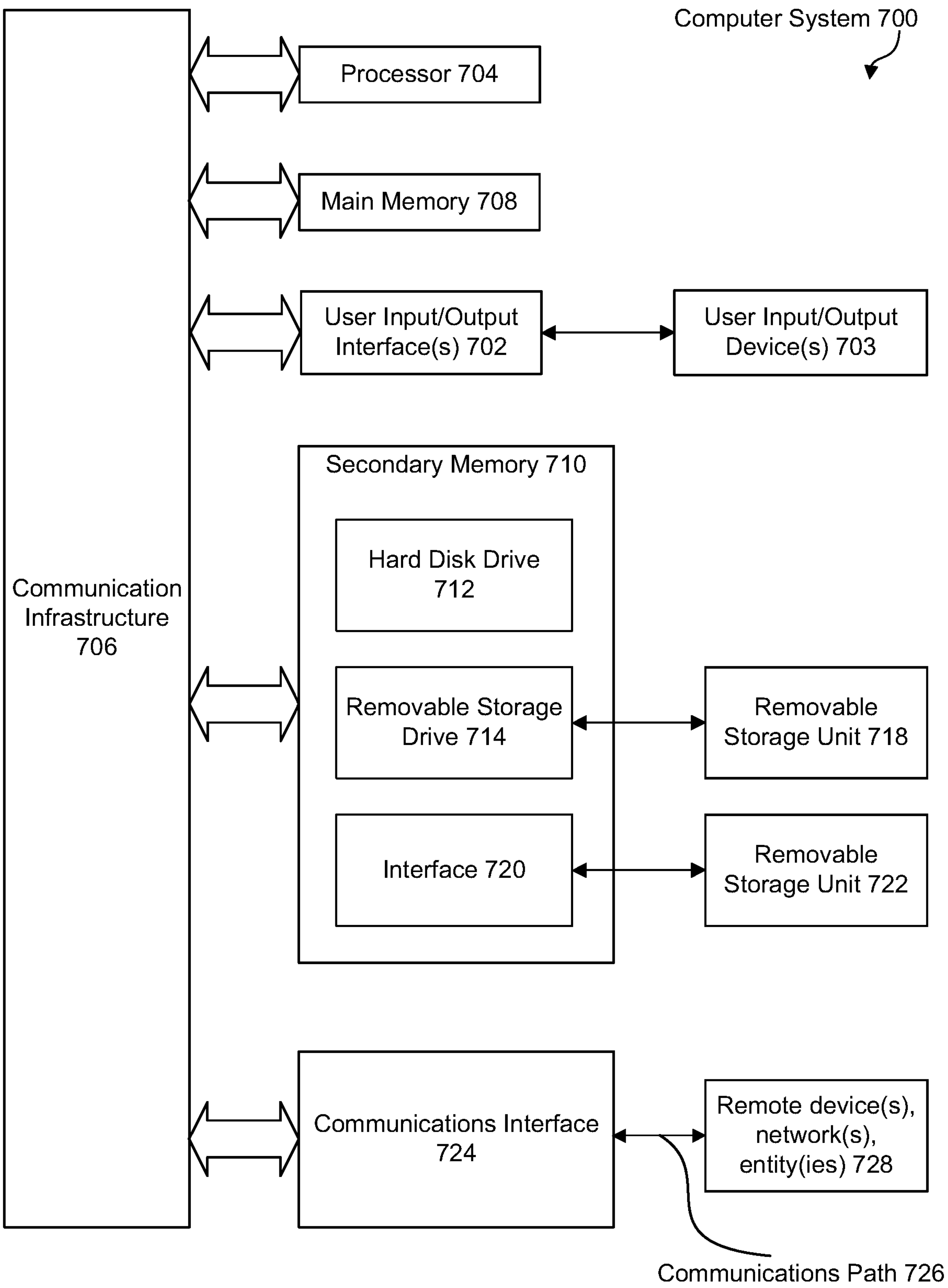
FIG. 7 illustrates an example computing device, according to an example embodiment.

Various embodiments may be implemented, for example, using one or more computer systems, such as computer system 700 shown in FIG. 7. One or more computer systems 700 may be used, for example, to implement any of the embodiments discussed herein, as well as combinations and sub-combinations thereof. For example, computer system 700 can be used to implement system 100 for frontend microservice application development and deployment, including mockup 124 and framework 134*b* of FIG. 1, method 400 for performing a microservice frontend development, and/or any other implementations of the disclosed embodiments.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In some embodiments, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It should be understood that the operations shown in the exemplary methods are not exhaustive and that other operations can be performed as well before, after, or between any of the illustrated operations. In some embodiments of the present disclosure, the operations can be performed in a different order and/or vary.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

What is claimed is:

1. A method for creating and integrating a microservice frontend application into a host platform, the method comprising:

communicating, to a UX development platform executed by one or more processors, a requirements package corresponding to the microservice frontend application;

generating, by the UX development platform, a mockup package based on the requirements package;

communicating the mockup package to a microservice frontend development platform executed by the one or more processors;

generating, by the microservice frontend development platform, a microservice frontend application package based on the mockup package, wherein the microservice frontend application package is configured to operate in a local microservices development mode that executes in a containerized runtime on a developer's local machine, functions independently from the host platform, thereby enabling development, testing, and debugging without requiring deployment to the host platform; and integrating the microservice frontend application package, wherein an application is integrated utilizing the microservice frontend application based on the requirements package, wherein the microservice frontend application package is deployed as one or more container(s) that function as a route store configured to connect, via a REST-Store layer, to a microservice backend application and an Application Packaging Standard (APS) bus.

2. The method of claim 1, wherein the generating the mockup package based on the requirements package further comprises: generating a token package comprising one or more reusable design token(s).

3. The method of claim 2, wherein the token package is configured to utilizable by one or more other frontend microservice application(s).

4. The method of claim 1, wherein the generating the mockup package based on the requirements package further comprises: generating a handoff document corresponding to a gallery of reference components.

5. The method of claim 1, wherein the generating the microservice frontend application package based on the mockup package comprises: implementing a microservice code with one or more framework documents.

6. The method of claim 1, wherein the generating the mockup package based on the requirements package further comprises: generating, by the UX development platform, one or more storybook(s) based on the requirements package.

7. The method of claim 6, wherein the generating the mockup package based on the requirements package further comprises: publishing, by the UX development platform, the storybook(s).

8. A system for creating and integrating microservice frontend applications into a host platform, the system comprising: a processing system having one or more processors that execute computer-executable instructions that cause the processing system to:

communicate, to a UX development platform executed by the processing system, a requirements package corresponding to a microservice frontend application;

generate, by the UX development platform, a mockup package based on the requirements package;

communicate the mockup package to a microservice frontend development platform executed by the processing system;

generate, by the microservice frontend development platform, a microservice frontend application package based on the mockup package, wherein the microservice frontend application package is configured to operate in a local microservices development mode that executes in a containerized runtime on a developer's local machine, functions independently from the host platform, thereby enabling development, testing, and debugging without requiring deployment to the host platform; and integrate the microservice frontend application package, wherein an application is integrated utilizing the microservice frontend application based on the requirements package, wherein the microservice frontend application package is deployed as one or more container(s) that function as a route store configured to connect, via a REST-Store layer, to a microservice backend application and an Application Packaging Standard (APS) bus.

9. The system of claim 8, wherein the computer-executable instructions cause the processing system to: generate a token package comprising one or more reusable design token(s).

10. The system of claim 9, wherein the token package is configured to utilizable by one or more other frontend microservice application(s).

11. The system of claim 8, wherein the computer-executable instructions cause the processing system to: generate a handoff document corresponding to a gallery of reference components.

12. The system of claim 8, wherein the computer-executable instructions cause the processing system to: implement a microservice code with one or more framework documents.

13. The system of claim 8, wherein the computer-executable instructions cause the processing system to: generate, by the UX development platform, one or more storybook(s) based on the requirements package.

14. The system of claim 13, wherein the computer-executable instructions cause the processing system to: publish, by the UX development platform, the storybook(s).

15. A computer program stored on a non-transitory computer-readable medium for creating and integrating microservice frontend applications into a host platform, the computer program comprising computer-readable program code capable of being executed by at least one processor when retrieved from a non-transitory computer-readable medium, the program code comprising instructions configured to cause the processor to:

communicate, to a UX development platform executed by the at least one processor, a requirements package corresponding to a microservice frontend application, generate, by the UX development platform, a mockup package based on the requirements package;

communicate the mockup package to a microservice frontend development platform executed by the at least one processor, generate, by the microservice frontend development platform, a microservice frontend application package based on the mockup package, wherein the microservice frontend application package is configured to operate in a local microservices development mode that executes in a containerized runtime on a developer's local machine, functions independently from the host platform, thereby enabling development, testing, and debugging without requiring deployment to the host platform; and integrate the microservice frontend application package, wherein an application is integrated utilizing the microservice frontend application based on the requirements package, wherein the microservice frontend application package is deployed as one or more container(s) that function as a route store configured to connect, via a REST-Store layer, to a microservice backend application and an Application Packaging Standard (APS) bus.

16. The computer program product of claim 15, wherein the computer-executable instructions that cause the processing system to: generate a token package comprising one or more reusable design token(s).

17. The computer program product of claim 15, wherein the token package is configured to utilizable by one or more other frontend microservice application(s).

18. The computer program product of claim 15, wherein the computer-executable instructions cause the processing system to: implement a microservice code with one or more framework documents.

19. The computer program product of claim 15, wherein the computer-executable instructions cause the processing system to: generate, by the UX development platform, one or more storybook(s) based on the requirements package.

20. The computer program product of claim 19, wherein the computer-executable instructions cause the processing system to: publish, by the UX development platform, the storybook(s).

* * * * *